United States Patent [19]

Nakagawa

[11] Patent Number: 5,592,219
[45] Date of Patent: Jan. 7, 1997

[54] METHOD OF READING OUT SIGNALS FOR A SOLID-STATE IMAGING DEVICE

[75] Inventor: Tadashi Nakagawa, Nabari, Japan

[73] Assignee: Sharp Kabushiki Kaisha, Osaka, Japan

[21] Appl. No.: 439,445

[22] Filed: May 11, 1995

Related U.S. Application Data

[63] Continuation of Ser. No. 103,734, Aug. 6, 1993, abandoned, which is a continuation of Ser. No. 832,852, Feb. 7, 1992, abandoned.

[30] Foreign Application Priority Data

Feb. 8, 1991 [JP] Japan ..................... 3-017491

[51] Int. Cl.$^6$ ..................... H04N 5/225; H04N 5/335
[52] U.S. Cl. ..................... 348/216; 348/297; 348/312
[58] Field of Search ..................... 348/216, 217, 348/219, 297, 305, 317, 320, 322, 312; H04N 5/225, 5/335

[56] References Cited

U.S. PATENT DOCUMENTS 3,911,467  10/1975  Levine et al. ..................... 357/24
4,527,199   7/1985  Kinoshita et al. ..................... 358/213
4,805,026   2/1989  Oda ..................... 348/320
4,995,061   2/1991  Hynecek ..................... 377/58
4,996,600   2/1991  Nishida et al. ..................... 358/213.22

FOREIGN PATENT DOCUMENTS

0265302A1  4/1988  European Pat. Off. ....... H04N 5/335
0265302    4/1988  European Pat. Off. ....... H04N 5/335

Primary Examiner—Leo Boudreau
Assistant Examiner—Bipin Shalwala
Attorney, Agent, or Firm—David G. Conlin; Milton Oliver

[57] ABSTRACT

A method of reading out signals for a solid-state imaging device is disclosed. In this method, the timing of a final gate transfer clock signal $\phi_{H1}'$ and the timing of a reset pulse signal $\phi_R$ are both synchronized with two clock cycles of a horizontal CCD clock signals $\phi_{H1}$ and $\phi_{H2}$, to combine signal charges from two horizontally adjacent pixel pairs. Accordingly, the sensitivity under a low light intensity can be enhanced in a simple and inexpensive way without modifying the structure of the solid-state imaging device or adding an external device.

15 Claims, 6 Drawing Sheets

METHOD OF READING OUT SIGNALS FOR A SOLID-STATE IMAGING DEVICE

This is a continuation of application Ser. No. 08/103,734 filed on Aug. 6, 1993 now abandoned which is a FWC of appn. Ser. No. 07/832,852 filed on Feb. 7, 1992 now abandoned.

BACKGROUND OF THE INVENTION

1. Field of the Invention

The present invention relates to a method of reading out signals for a solid-state imaging device used in a video camera, image pick-up device, or the like.

2. Description of the Prior Art

Nowadays, two-dimensional solid-state imaging devices using charge transfer means are widely used in broadcast and home video cameras and the like. To produce images using such two-dimensional solid-state imaging devices and conforming to the scanning system of television, 2:1 interlaced scanning must be performed in the two-dimensional imaging devices to conform to the 2:1 interlaced scanning system of television in which two fields are traced during each frame period. The following describes a method of reading out signals for a solid-state imaging device in which 2:1 interlacing in such a two-dimensional solid-state imaging device is achieved by a field-integration method.

Figure 6:
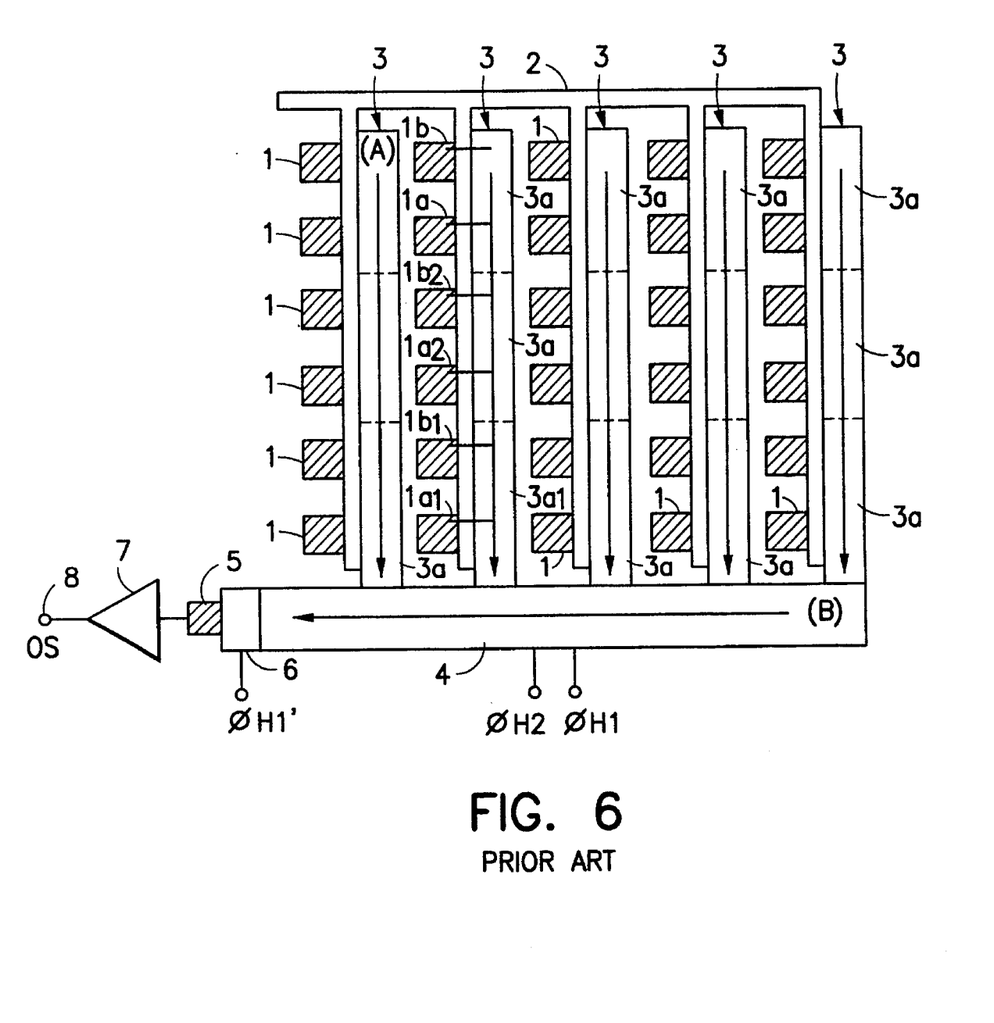
FIG. 6 shows a schematic diagram of an interline transfer charge-coupled (CCD) area/image sensor as an example of a two-dimensional solid-state imaging device in which 2:1 interlacing is achieved by a field-integration method.

FIG. 6 shows a schematic diagram of an interline transfer charge-coupled (CCD) area/image sensor as an example of a two-dimensional solid-state imaging device in which 2:1 interlacing is achieved by a field-integration method. In the area/image sensor shown, a plurality of photoelectric convertors 1, 1, . . . each comprising a photodiode, an MOS transistor, etc. are arranged in a lattice-like array (i.e., an array of rows and columns) corresponding to the pixels of the television display system. When a gate pulse is applied to a transfer gate 2 during the vertical blanking period, charges generated by the photoelectric convertors 1, 1, . . . in proportion to the light intensity are simultaneously transferred into corresponding storage sites 3a, 3a, . . . in vertical transfer sections 3 consisting of CCDs arranged in the vertical direction alternately with the vertical arrays of photoelectric convertors 1, 1, . . . . . After that, photoelectric conversion is performed once again by the photoelectric convertors 1, 1, . . ., so that the next set of signal charges proportional to the light intensity are accumulated.

During each horizontal blanking period, the signal charges transferred from the photoelectric convertors 1, 1, . . . to the corresponding storage sites 3a, 3a, . . . in the vertical transfer sections 3 are transferred line by line, as shown by arrow (A), into corresponding storage sites (not shown) in a horizontal transfer section 4 consisting of a CCD array. The signal charges for one scanning line that have been transferred into the horizontal transfer section 4 are then clocked horizontally, as shown by arrow (B), toward the final stage transfer gate 6 by the clock timing shown in FIG. 8. The signal charges for one field are thus output line by line from the final stage transfer gate 6 to a charge detector 5, and the signal sensed by the charge detector 5 is amplified by an amplifier 7 to form a standard video signal.

Figure 7:
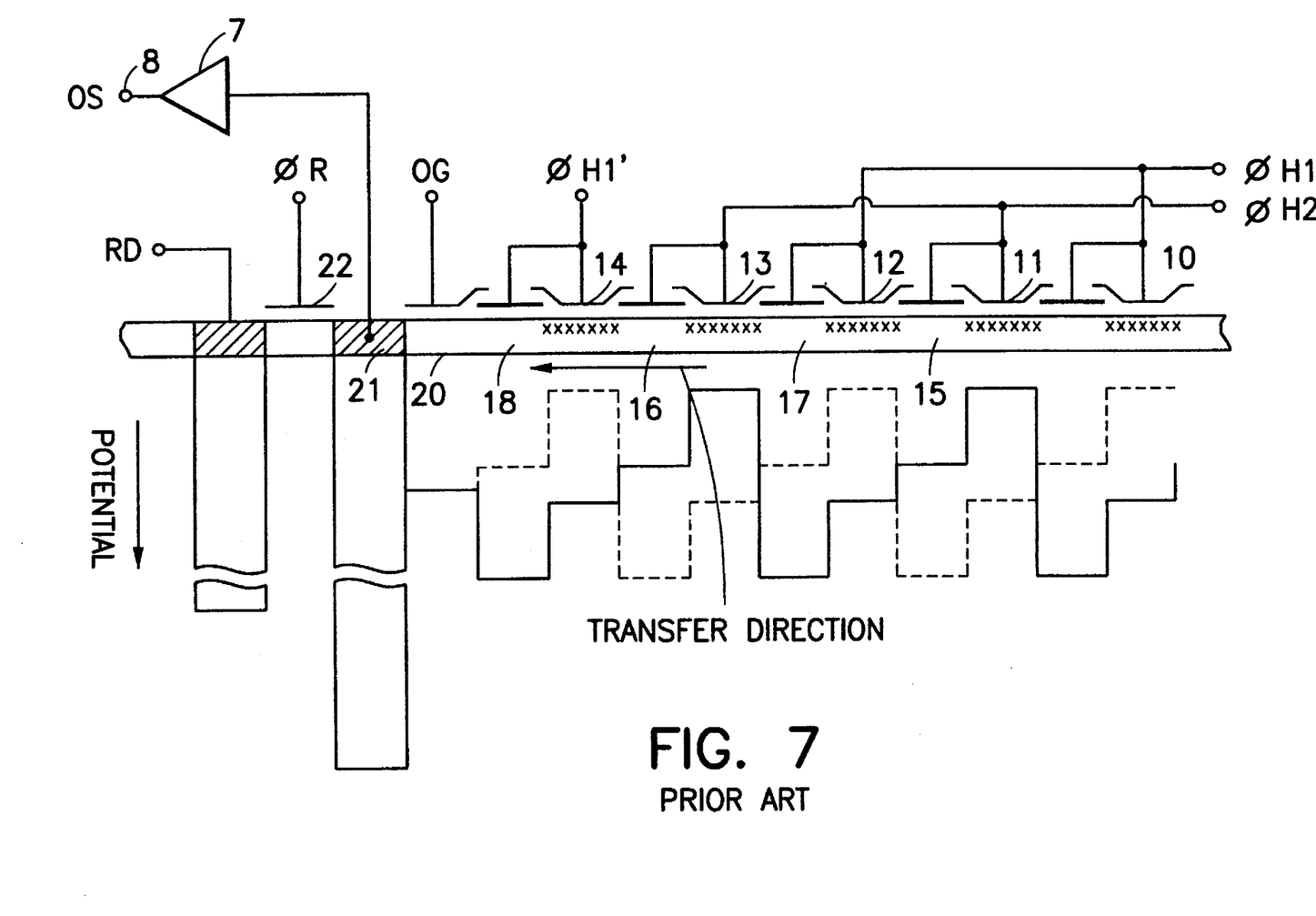
FIG. 7 is a cross sectional view of the horizontal transfer section 4, transfer gate 6, and charge detector 5 of FIG. 6, with applied potentials indicated.

FIG. 7 is a cross sectional view of the horizontal transfer section 4, transfer gate 6, and charge detector 5 of FIG. 6, with applied potentials indicated.

The above-mentioned field-integration method achieves 2:1 interlacing by reading out signals in the following manner. In the field-integration method, all the signal charges generated by the photoelectric convertors (hereinafter referred to as pixels) to produce one frame are read out during one field period. To achieve this, signal charges from two vertically adjacent pixels $1a$ and $1b$ shown in FIG. 6 (hereinafter simply referred to as "pixel pair") are combined and simultaneously read out into one storage site $3a$ in the adjacent vertical transfer section 3. For example, for an odd-numbered field, signal charges from a pixel $1a_1$ and a pixel $1b_1$ are combined and simultaneously transferred into one storage site $3a_1$ in the adjacent vertical transfer section 3 (as shown by solid arrows in FIG. 6); on the other hand, for an even-numbered field, signal charges from a pixel pair offset by one pixel in the vertical direction, i.e. the pixel $1b_1$ and a pixel $1a_2$, are combined and simultaneously transferred into the storage site $3a_1$ (as shown by dotted arrows in FIG. 6). As a result, as shown in FIG. 9, apparent space sampling points for an odd-numbered field are each taken at the middle point (indicated by a circle numbered "1") between two vertically adjacent pixels $1a$ and $1b$ constituting each pixel pair in areas 31 defined by thin solid lines, while apparent space sampling points for an even-numbered field are each taken at the middle point (indicated by a square numbered "2") between two vertically adjacent pixels $1b$ and $1a$ constituting each pixel pair in areas 32 defined by thin dotted lines.

Figure 9:
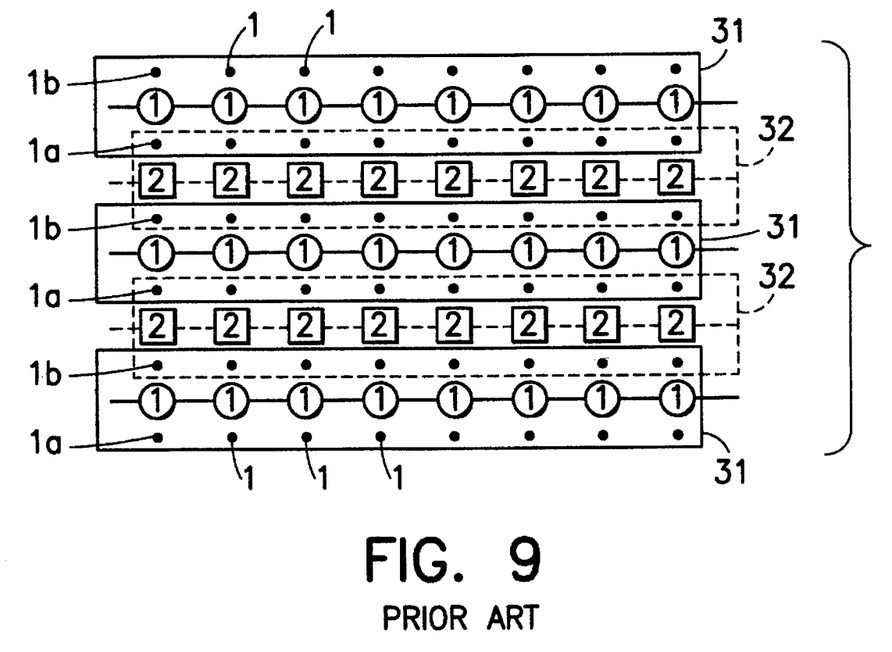
FIG. 9 shows the arrangement of space sampling points in the prior art method.

The space sampling points are thus arranged in a lattice-like pattern, as shown in FIG. 9, at the same intervals at which the pixels 1, 1, . . . are arranged.

Figure 8:
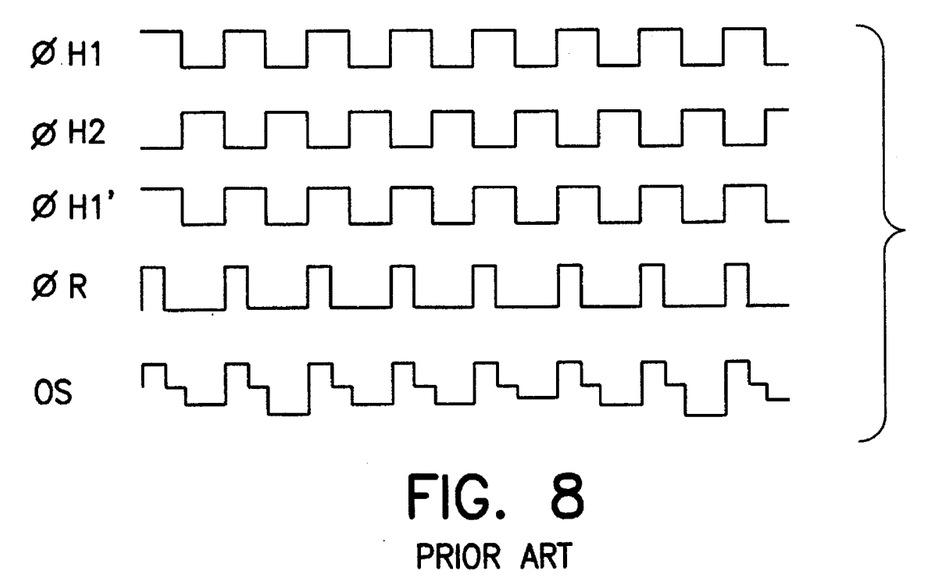
FIG. 8 shows a clock timing chart of a prior art method.

As shown in FIG. 8, in the method of reading out signals for the above solid-state imaging device, the timing of both a final gate transfer pulse signal $\phi_{H1}'$ and a reset pulse signal $\phi_R$ is set so as to synchronize with a horizontal CCD drive pulse signal $\phi_{H1}$ and a horizontal CCD drive pulse signal $\phi_{H2}$ with the same clock cycle. Therefore, every space sampling point is positioned at the middle point between two vertically adjacent pixels constituting each pixel pair. That is, the signal charge obtained from a given space sampling point represents combined signal charges of two vertically adjacent pixels.

However, with the recent advances toward increased pixel count and miniaturization of optics, the unit pixel area has been reduced to such a degree that the sensitivity characteristics of photoelectric convertors under a low light intensity are now nearing the theoretical point where shot noise associated with photoelectric conversion will become dominant. Therefore, the above method of reading out signals for a solid-state imaging device has the problem that since the signal charge of one space sampling point is obtained by combining signal charges of two vertically arranged pixels 1 and 1, the absolute signal charge amount is low per space sampling point, resulting in a drop in the signal-to-noise ratio under a low light intensity, and hence degradation in sensitivity characteristics.

SUMMARY OF THE INVENTION

The method of reading out signals of this invention for a solid-state imaging device comprising photoelectric conversion means and charge transfer means, said photoelectric conversion means having a plurality of pixels arranged in an array of rows and columns, each of said pixels converting light to signal charges, said charge transfer means receiving said signal charges and transferring said signal charges to an output of said device overcomes the above-discussed and numerous other disadvantages and deficiencies of the prior art. In this method of the invention, signal charges generated in a plurality of horizontally adjacent ones of said pixels are combined in said charge transfer means and outputted at said output in a combined form.

In a preferred embodiment, combinations of said plurality of horizontally adjacent ones of said pixels for combining the signal charges are periodically changed.

In a preferred embodiment, video signal conforming to the 2:1 interlaced scanning is produced by changing said combinations of said plurality of horizontally adjacent ones of said pixels for combining the signal charges between an odd-numbered field and an even-numbered field.

In a preferred embodiment, timing of reset clock signal for resetting said signal charges is synchronized with two clock cycles of horizontal CCD clock signals for horizontally transferring said signal charges to said output, and said signal charges of two horizontally adjacent pairs of said pixels are outputted at said output.

In a preferred embodiment, timing of final gate transfer clock signal and timing of reset clock signal for resetting said signal charges are synchronized with two clock cycles of horizontal CCD clock signals for horizontally transferring said signal charges to said output, and said signal charges of two horizontally adjacent pairs of said pixels are outputted at said output.

In a preferred embodiment, timing of reset clock signal for resetting said signal charges is synchronized with three or more clock cycles of horizontal CCD clock signals for horizontally transferring said signal charges to said output, and said signal charges of three or more horizontally adjacent ones of said pixels are outputted at said output.

In a preferred embodiment, timing of final gate transfer clock signal and, timing of reset clock signal for resetting said signal charges are synchronized with three or more clock cycles of horizontal CCD clock signals for horizontally transferring said signal charges to said output, and signal charges of three or more horizontally adjacent ones of said pixels are outputted at said output.

Thus, the invention described herein makes possible the objective of providing a method of reading out signals for a solid-state imaging device, which can enhance the sensitivity under a low light intensity in a simple and inexpensive way without modifying the structure of the solid-state imaging device or adding an external device.

BRIEF DESCRIPTION OF THE DRAWINGS

This invention may be better understood and its numerous objects and advantages will become apparent to those skilled in the art by reference to the accompanying drawings as follows:

FIGS. 1A and 1B are clock timing charts of an embodiment according to the invention, FIG. 1A is for an odd-numbered field and FIG. 1B for an even-numbered field;

DESCRIPTION OF THE PREFERRED EMBODIMENTS

The preferred embodiments of the present invention will now be described in detail with reference to the accompanying drawings.

Figure 1A:
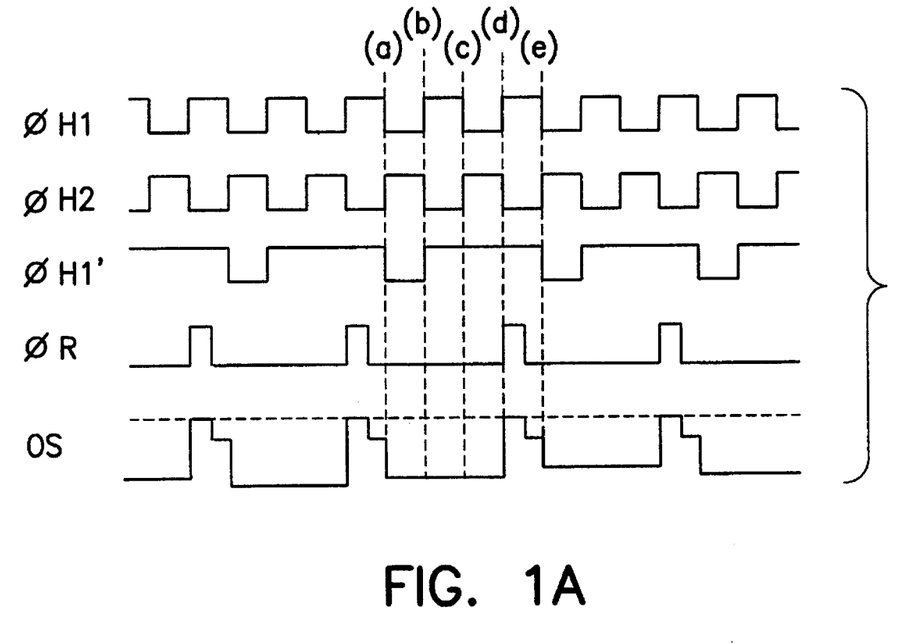
Figure 1B:
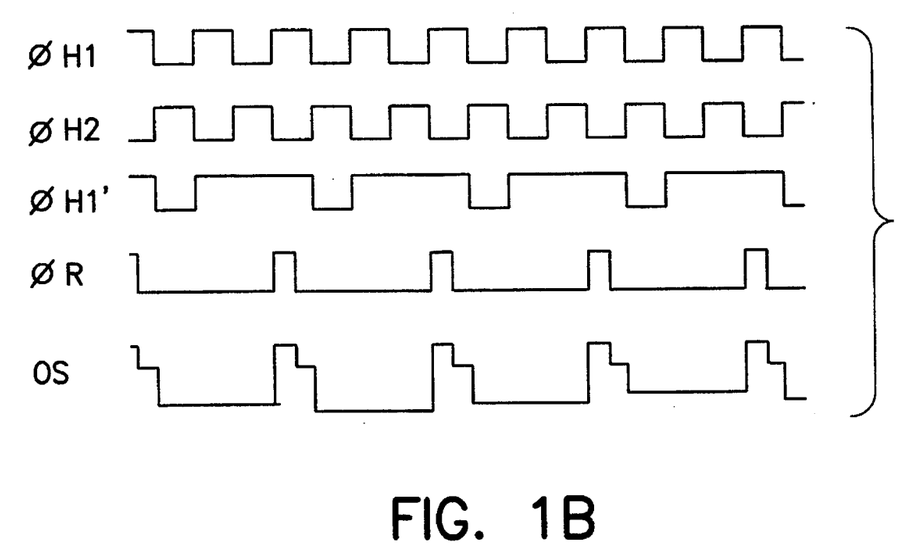

FIGS. 1A and 1B are clock timing charts of this embodiment for the horizontal transfer section 4 shown in FIG. 6: FIG. 1A is for an odd-numbered field and FIG. 1B for an even-numbered field. The following detailed description deals with a method of reading out signals according to this embodiment with reference to FIGS. 1, 6, and 7.

In this embodiment, the timing of a final gate transfer clock signal $\phi_{H1}'$ applied to the final transfer electrode 14 of the transfer gate 6 (see FIG. 7) and the timing of a reset clock signal $\phi_R$ applied to a reset transistor 22 (see FIG. 7) are both synchronized with two clock cycles of both horizontal CCD clock signals $\phi_{H1}$ and $\phi_{H2}$, as shown in the clock timing chart of FIG. 1 for the horizontal transfer section 4. Thus, when the horizontal CCD clock signal $\phi_{H1}$ goes low and the horizontal CCD clock signal $\phi_{H2}$ goes high at time (a) in FIG. 1A, the final gate transfer clock signal $\phi_{H1}'$ goes low, causing the potential profiles in a region 18 to vary as shown by a thin dotted line in FIG. 7. This causes the signal charge held at the region 18 and pertaining to the immediately preceding pixel pair to be transferred to a floating diffusion layer 21 in the charge detector 5 where the signal charge is converted to a voltage for output through the amplifier 7.

Next, at time (b), the final gate transfer clock signal $\phi_{H1}'$ goes high making the potential at the region 18 higher than that at a region 20, as shown by a thin solid line, and thus preventing the signal charge transferred to the region 18 from being transferred to the floating diffusion layer 21. At the same time, the horizontal CCD clock signal $\phi_{H1}$ goes high and the horizontal CCD clock signal $\phi_{H2}$ goes low, causing the potential profiles under electrodes 10, 11, 12, and 13 to vary as shown by a thick solid line in FIG. 7, so that the signal charge transferred from one pixel pair and held at a region 16 and the signal charge transferred from another pixel pair and held at a region 15 are now transferred to the regions 18 and 17, respectively. Thus, the signal charge transferred from said one pixel pair is stored at the region 18. Thereafter, at time (c), the horizontal CCD clock signal $\phi_{H1}$ goes low and the horizontal CCD clock signal $\phi_{H2}$ goes high, causing the potential profiles under the electrodes 10, 11, 12, and 13 to vary as shown by a thick dotted line in FIG. 7, so that the signal charge transferred from said other pixel pair and stored at the region 17 at time (b) is now transferred to the region 16. At this time, since the final gate transfer clock signal $\phi_{H1}'$ is kept high, the signal charge of said one pixel pair, transferred to the region 18 at time (b), remains held at the region 18.

Next, at time (d), the horizontal CCD clock signal $\phi_{H1}$ again goes high and the horizontal CCD clock signal $\phi_{H2}$ goes low, so that the signal charge of said other pixel pair, transferred to the region 16 at time (c), is now transferred to the region 18. In this manner, the signal charge of said one pixel pair, which has been held at the region 18 since time (b), is combined with the signal charge of said other pixel pair horizontally adjacent to said one pixel pair. At the same time, the reset clock signal $\phi_R$ goes high to reset the potential of the floating diffusion layer 21 in the charge detector 5 to the reference level.

Thereafter, at time (e), the final gate transfer clock signal $\phi_{H1}'$ goes low, so that the signal charge representing the combined signal charges of the two pixel pairs and held at the region 18 is now transferred to the floating diffusion layer 21 in the charge detector 5 where the signal charge is converted to a voltage. Then, an output signal OS is output which represents the potential difference between the potential based on the combined signal charges of the four pixels 1 and the reference potential. At the same time, the horizontal CCD clock signal $\phi_{H1}$ goes high and the horizontal CCD clock signal $\phi_{H2}$ goes low, initiating the transfer operation of signal charges pertaining to the next combination of two horizontally adjacent pixel pairs.

Figure 2:
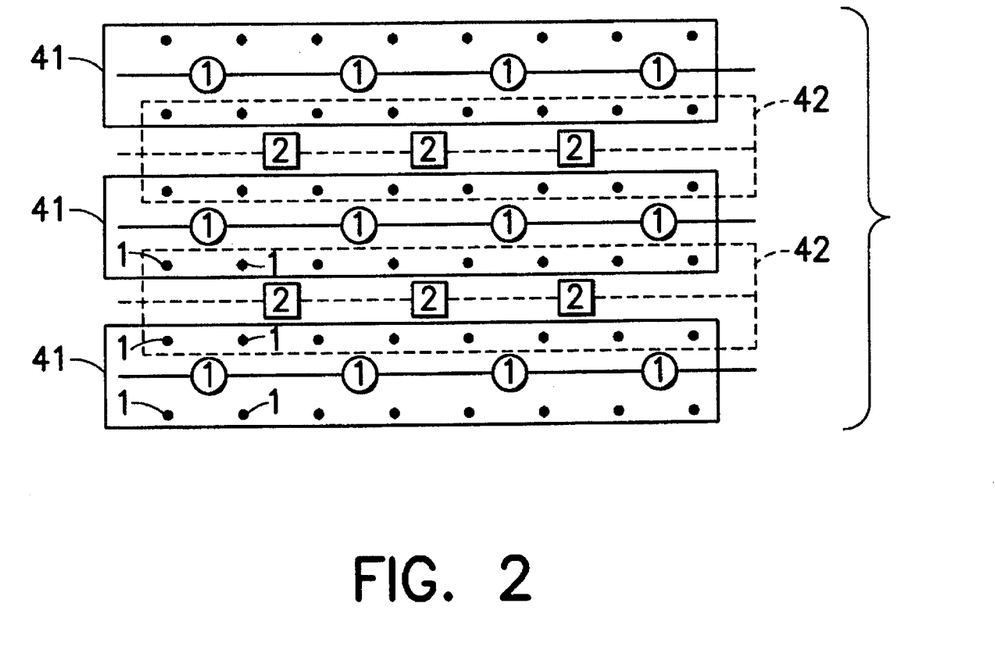
FIGS. 2 and 3 both show the arrangement of space sampling points in which the space sampling points for every horizontal scan are aligned from one scanning line to the next within the same field.

As described above, the signal charges from the two horizontally adjacent pixel pairs comprising a total of four pixels i are combined to obtain a signal charge pertaining to one space sampling point. As a result, in this embodiment, the space sampling points for an odd-numbered field are each taken, as shown in FIG. 2, at the middle point (indicated by a circle numbered "1") between four horizontally and vertically adjacent pixels 1, 1, . . . in each region 41 defined by a thin solid line. On the other hand, the space sampling points for an even-numbered field are each taken at the middle point (indicated by a square numbered "2") between four horizontally and vertically adjacent pixels 1, 1, . . . in each region 42 defined by a thin dotted line.

As is apparent from the comparison between the timing diagrams of FIGS. 1A and 1B, for an even-numbered field the timing to set the final gate transfer clock signal $\phi_{H1}'$ low and the timing to set the reset clock signal $\phi_R$ high are delayed by one clock cycle of the horizontal CCD clock signals $\phi_{H1}$ and $\phi_{H2}$, compared to the timing for an odd-numbered field. The combination of two horizontally adjacent pixel pairs for combining the signal charges is thus offset by one pixel in the horizontal direction between the odd-numbered field and the even-numbered field, thereby achieving, as shown in FIG. 2, a staggered lattice-like arrangement of the apparent space sampling points. This arrangement better serves to prevent degradation in modulation transfer function (MTF) characteristics than when the space sampling points are arranged in a simple lattice-like pattern as shown in FIG. 3.

By thus combining signal charges of four pixels to obtain a signal charge pertaining to one space sampling point, the signal charge amount can be increased in proportion to the increase of the photosensitive area of one space sampling point, thereby achieving an improvement in the signal-to-noise ratio. That is, a higher sensitivity can be obtained for a low light intensity although the image resolution drops to a certain degree.

Figure 3:
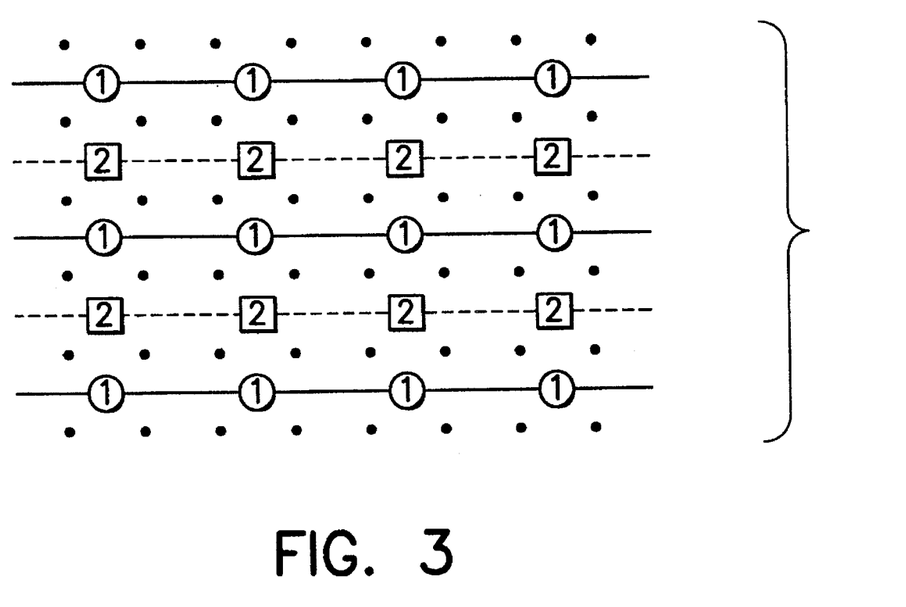
Figure 4:
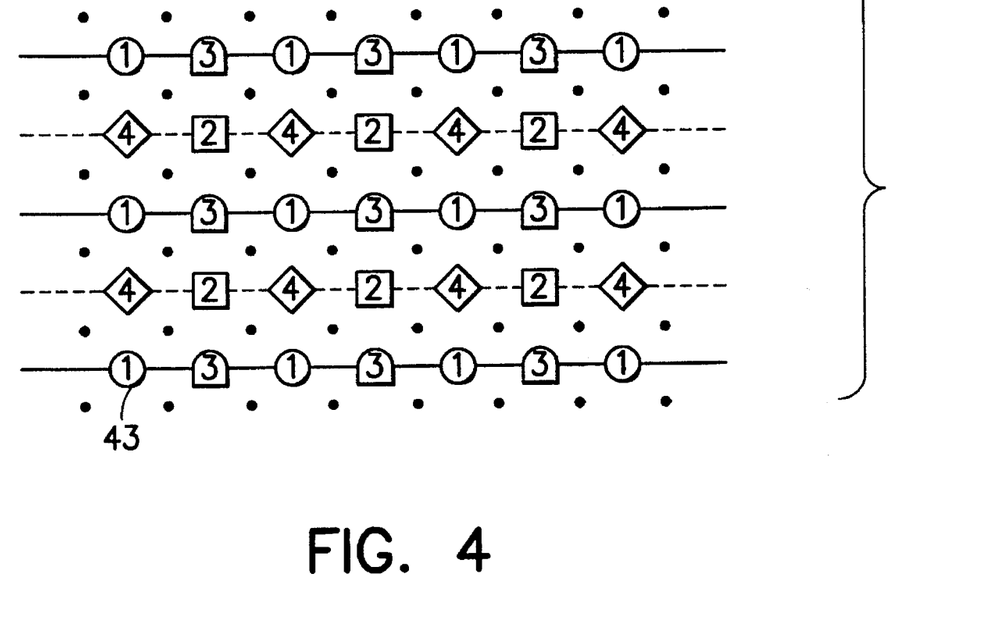
FIGS. 4 and 5 show the arrangement of space sampling points when the arrangement of space sampling points on the scanning lines for the same field is offset between each horizontal scan.
Figure 5:
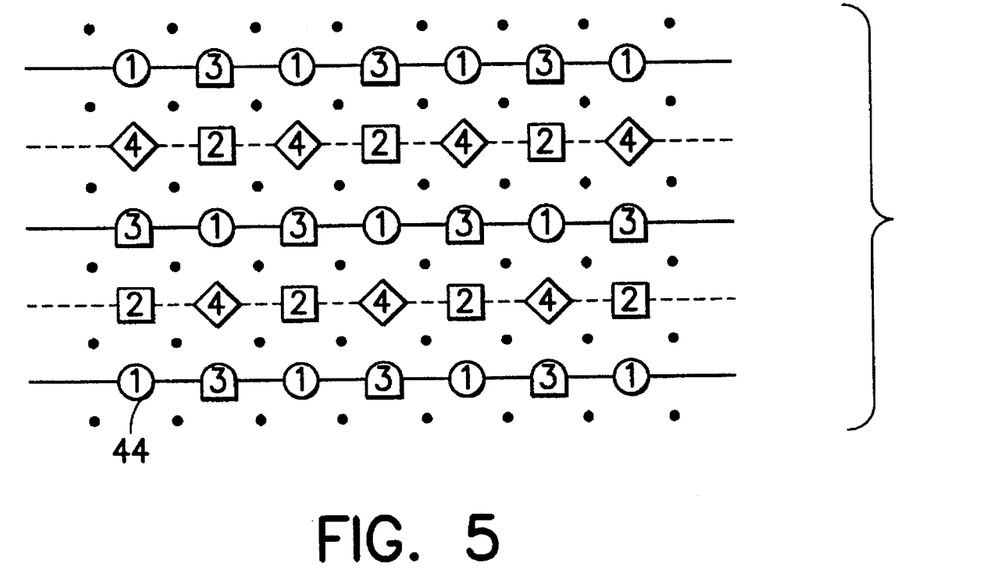

FIGS. 2 and 3 both show the arrangement of space sampling points in which the space sampling points for every horizontal scan are aligned from one scanning line to the next within the same field. On the other hand, FIGS. 4 and 5 show the arrangement of space sampling points when the arrangement of space sampling points on the scanning lines for the same field is offset between each horizontal scan. The numbers in the figures indicate the scanning numbers. FIG. 4 shows the arrangement in which the space sampling points for the same field are taken at the same points, while FIG. 5 shows the arrangement in which the space sampling points for the same field are offset by one pixel in the horizontal direction between adjacent scanning lines. In either case, the space sampling points are arranged in a lattice-like pattern, at the same intervals at which the pixels 1 are arranged, which serves to prevent degradation in horizontal resolution that occurs with the arrangements of space sampling points shown in FIGS. 2 and 3. However, after sampling a signal charge pertaining to a given space sampling point, for example, a space sampling point 43, 44 of scanning number "1" in an odd-numbered field, it takes the time equivalent to four fields before sampling the signal charge pertaining to the same sampling point 43, 44, and hence, the resolution slightly drops in the case of a fast moving object.

As described, in the present embodiment, the timing of the final gate transfer clock signal $\phi_{H1}'$ and the timing of the reset clock signal $\phi_R$ are both synchronized with two clock cycles of the horizontal CCD clock signals $\phi_{H1}$ and $\phi_{H2}$, as shown in the clock timing chart for the horizontal transfer section 4, for sampling signal charges from each pixel pair in the interline transfer CCD area/image sensor which is a two-dimensional solid-state imaging device. Therefore, the output signal OS supplied from the output terminal 8 is based on the combined signal charges obtained from two horizontally adjacent pixel pairs. By combining signal charges from two pixel pairs, the signal-to-noise ratio of luminance signal components can be improved (for example, shot noise is reduced by 3 dB by combining signal charges from two pixel pairs), thereby providing enhanced sensitivity for applications where a low light intensity is used.

It should be noted, however, that the enhancement of sensitivity decreases the resolution to a certain degree, since the horizontal resolution decreases as the photosensitive area of one space sampling point increases. However, since the resolution of the human eye also tends to drop under a low light intensity, it does not present much of a problem.

Furthermore, in the present embodiment, when obtaining the video signal conforming to the 2:1 interlaced scanning by offsetting the combination of two vertically adjacent pixels in the vertical direction between the odd-numbered field and the even-numbered field, the combination of two horizontally adjacent pixel pairs for combining the signal charges is periodically changed between each field or between adjacent scanning lines within the same field. In other words, the arrangement of apparent space sampling points is periodically shifted between each field or between adjacent scanning lines within the same field. This serves to prevent degradation in MTF characteristics.

Thus, according to the present embodiment, it is possible to enhance the sensitivity under a low light intensity in a simple and inexpensive way and prevents degradation in MTF characteristics without modifying the structure of the interline transfer CCD area/image sensor or adding an external device.

In the above embodiment, the timing of the final gate transfer clock signal $\phi_{H1}'$ and the timing of the reset clock signal $\phi_R$ are both synchronized with two clock cycles of the horizontal CCD clock signals $\phi_{H1}$ and $\phi_{H2}$, to store the signal charges of two horizontally adjacent pixel pairs at the region 18 as shown in FIG. 7. However, the present invention is not limited to the above clocking, but only the reset clock signal $\phi_R$ may be synchronized with two clock cycles of the horizontal CCD clock signals $\phi_{H1}$ and $\phi_{H2}$, to achieve enhancement of sensitivity in a simpler manner.

In the above embodiment, the timing of the final gate transfer clock signal $\phi_{H1}'$ and the timing of the reset pulse signal $\phi_R$ are both synchronized with two clock cycles of the horizontal CCD clock signals $\phi_{H1}$ and $\phi_{H2}$, to combine the signal charges from two horizontally adjacent pixel pairs. However, the invention is not limited to the above clocking, but the timing of the final gate transfer clock signal $\phi_{H1}'$ and the timing of the reset clock signal $\phi_R$ may be so set as to synchronize with three or more clock cycles of the horizontal CCD clock signals $\phi_{H1}$ and $\phi_{H2}$ so that signal charges from three or more horizontally adjacent pixel pairs may be combined.

In the above embodiment, the horizontal transfer section 4 has been described as a two-electrode cell CCD array, but it will be appreciated that the invention is not restricted to this construction.

Also, in the description of the above embodiment, an interline transfer CCD area/image sensor is taken as an example, but it will be appreciated that the solid-state imaging device contemplated under the present invention is not limited to the one described above.

As is apparent from the above description, according to the method of reading out signals for a solid-state imaging device in the first embodiment of the invention, when reading out signal charges obtained by photoelectric conversion by photoelectric conversion means comprising pixels, signal charges pertaining to a plurality of horizontally adjacent pixels are read out in a combined form, and therefore, the sensitivity under a low light intensity can be enhanced in a simple and inexpensive way without modifying the structure of the solid-state imaging device or adding an external device.

According to the method of reading out signals for a solid-state imaging device in the second embodiment of the invention, the method of the first embodiment is so adapted that the combination of a plurality of horizontally adjacent pixel pairs for combining the signal charges can be periodically changed, enabling the arrangement of apparent space sampling points to be shifted periodically. The second embodiment therefore provides the advantage, in addition to the advantages of the first embodiment, that degradation in MTF characteristics can be prevented.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of reading out signals for a solid-state imaging device comprising photoelectric conversion means, a plurality of vertical transfer sections, and a horizontal transfer section, said photoelectric conversion means having a plurality of pixels arranged in an array of rows and columns, each of said pixels converting light to signal charges, said plurality of vertical transfer sections receiving said signal charges and transferring said signal charges to an output of said device through said horizontal transfer section, the method comprising the step of synchronizing timing of a reset clock signal, for resetting said charges, wherein the resetting is performed only one time during at least two clock cycles of each of a plurality of horizontal CCD clock signals for horizontally transferring said signal charges to said output so that substantially all signal charges generated in at least two horizontally adjacent ones of said pixels, are combined in an end portion of said horizontal transfer section and are output at said output in a combined form.

2. A method according to claim 1, wherein combinations of said plurality of horizontally adjacent ones of said pixels for combining the signal charges are periodically changed.

3. A method according to claim 2, wherein video signal conforming to the 2:1 interlaced scanning is produced by changing said combinations of said plurality of horizontally adjacent ones of said pixels for combining the signal charges between an odd-numbered field and an even-numbered field.

4. A method according to claim 1, wherein timing of final gate transfer clock signal and timing of reset clock signal for resetting said signal charges are synchronized with two clock cycles of horizontal CCD clock signals for horizontally transferring said signal charges to said output, and said signal charges of two horizontally adjacent pairs of said pixels are outputted at said output.

5. A method according to claim 1, wherein timing of reset clock signal for resetting said signal charges is synchronized with at least three clock cycles of horizontal CCD clock signals for horizontally transferring said signal charges to said output, and said signal charges of at least three horizontally adjacent ones of said pixels are outputted at said output.

6. A method according to claim 1, wherein timing of final gate transfer clock signal and timing of reset clock signal for resetting said signal charges are synchronized with at least three clock cycles of horizontal CCD clock signals for horizontally transferring said signal charges to said output, and said signal charges of at least three horizontally adjacent ones of said pixels are outputted at said output.

7. A method according to claim 3, wherein timing of reset clock signal for resetting said signal charges is synchronized with two clock cycles of horizontal CCD clock signals for horizontally transferring said signal charges to said output, said signal charges of two horizontally adjacent parts of said pixels are outputted at said output, and for an even-numbered field said timing of reset clock signal is delayed by one clock cycle of said horizontal CCD clock signals, compared to said timing for an odd-numbered field.

8. A method according to claim 3, wherein timing of final gate transfer clock signal and timing of reset clock signal for resetting said signal charges are synchronized with two clock cycles of horizontal CCD clock signals for horizontally transferring said signal charges to said output, said signal charges of two horizontally adjacent parts of said pixels are outputted at said output, and for an even-numbered field said timing of final gate transfer clock signal and said timing of reset clock signal are delayed by one clock cycle of said horizontal CCD clock signals, compared to said timings for an odd-numbered field.

9. A method according to claim 3, wherein timing of reset clock signal for resetting said signal charges is synchronized with n clock cycles of horizontal CCD clock signals for horizontally transferring said signal charges to said output, said signal charges of n horizontally adjacent parts of said pixels are outputted at said output, and for an even-numbered field said timing of reset clock signal is delayed by n/2 clock cycles of said horizontal CCD clock signals, compared to said timing for an odd-numbered field, where n denotes an even number starting from 4.

10. A method according to claim 3, wherein timing of final gate transfer clock signal and timing of reset clock signal for resetting said signal charges are synchronized with n clock cycles of horizontal CCD clock signals for horizontally transferring said signal charges to said output, said signal charges of n horizontally adjacent pairs of said pixels are outputted at said output, and for an even-numbered field said timing of final gate transfer clock signal and said timing of reset clock signal are delayed by n/2 clock cycles of said horizontal CCD clock signals, compared to said timings for an odd-numbered field, where n denotes an even number starting from 4.

11. A method according to claim 3, wherein timing of reset clock signal for resetting said signal charges is synchronized with n clock cycles of horizontal CCD clock signals for horizontally transferring said signal charges to said output, said signal charges of n horizontally adjacent pairs of said pixels are outputted at said output, and for an even-numbered field said timing of reset clock signal is delayed by (n−1)/2 clock cycles of said horizontal CCD clock signals, compared to said timing for an odd-numbered field, where n denotes an odd number starting from 3.

12. A method according to claim 3, wherein timing of final gate transfer clock signal and timing of reset clock signal for resetting said signal charges are synchronized with n clock cycles of horizontal CCD clock signals for horizontally transferring said signal charges to said output, said signal charges of n horizontally adjacent pairs of said pixels are outputted at said output, and for an even-numbered field said timing of final gate transfer clock signal and said timing of reset clock signal are delayed by (n−1)/2 clock cycles of said horizontal CCD clock signals, compared to said timings for an odd-numbered field, where n denotes an odd number starting from 3.

13. A method of reading out signals for a solid-state imaging device comprising photoelectric conversion means, a plurality of vertical transfer sections, and a horizontal transfer section, said photoelectric conversion means having a plurality of pixels arranged in an array of rows and columns, each of said pixels converting light to signal charges, said plurality of vertical transfer sections receiving said signal charges and transferring said signal charges to an output of said device through said horizontal transfer section, the method comprising the step of synchronizing timing of a reset clock signal, for resetting said signal charges, wherein the resetting is performed only one time during at least two clock cycles of each of a plurality of horizontal CCD clock signals for horizontally transferring said signal charges to said output so that substantially all signal charges generated in at least two horizontally adjacent ones of said pixels, are combined in a charge detector.

14. A method according to claim 1, wherein the combining of substantially all signal charges is performed under a low light intensity.

15. A method according to claim 13, wherein the combining of substantially all signal charges is performed under a low light intensity.

* * * * *